United States Patent

Håland

[11] Patent Number: 5,454,590
[45] Date of Patent: Oct. 3, 1995

[54] VEHICLE IMPACT SENSOR ARRANGEMENT

[75] Inventor: Yngve Håland, Falsterbo, Sweden

[73] Assignee: Autoliv Development AB, Vargarda, Sweden

[21] Appl. No.: 365,054

[22] Filed: Dec. 28, 1994

Related U.S. Application Data

[63] Continuation of Ser. No. 971,989, Feb. 19, 1993, abandoned.

[30] Foreign Application Priority Data

May 8, 1991 [GB] United Kingdom .................... 9109943

[51] Int. Cl.⁶ .................................................. B60R 21/32
[52] U.S. Cl. ......................... 280/734; 180/274; 280/730.2
[58] Field of Search ............................. 280/734, 730 A, 280/730 R, 728 R; 180/274; 102/272, 273

[56] References Cited

U.S. PATENT DOCUMENTS

| | | | |
|---|---|---|---|
| 3,793,498 | 2/1974 | Matsui et al. | 180/274 |
| 3,883,156 | 5/1975 | Frazier | 137/68 |
| 4,014,565 | 3/1977 | Fieni | 180/274 |
| 4,172,603 | 10/1979 | St. Clair et al. | 280/734 |
| 4,706,990 | 11/1987 | Stevens | 280/734 |
| 4,833,994 | 5/1989 | Strobush | 102/272 |
| 4,966,388 | 10/1990 | Warner et al. | 280/734 |

FOREIGN PATENT DOCUMENTS

| | | |
|---|---|---|
| 0207584 | 1/1987 | European Pat. Off. . |
| 0305655 | 3/1989 | European Pat. Off. . |
| 3716168 | 11/1988 | Germany . |

Primary Examiner—Eric D. Culbreth
Attorney, Agent, or Firm—Spencer, Frank & Schneider

[57] ABSTRACT

A sensor arrangement for sensing an impact on a motor vehicle which has an outer skin and for activating a safety device within the vehicle. A sensor is located between the outer skin of the vehicle and an inner part of the vehicle which is relatively fixed in position, and is adapted to initiate activation of the safety device only when the outer skin of the vehicle moves at a speed greater than a predetermined speed relative to said fixed part of the vehicle. The sensor has a first part in the form of a housing containing a pyrotechnic material, and a second part in the form of a stab. One of the parts is supported by an inner part of the vehicle which is relatively fixed in position, while the other of the parts is adapted to be moved in response to movement of the outer skin of the vehicle during an impact. In an impact situation the second part in the form of a stab is moved into an engagement with the first part in the form of a housing containing a pyrotechnic material with a speed related to the speed of movement of the outer skin, and the pyrotechnic material ignites when the speed of movement of the vehicle skin exceeds a predetermined level.

11 Claims, 4 Drawing Sheets

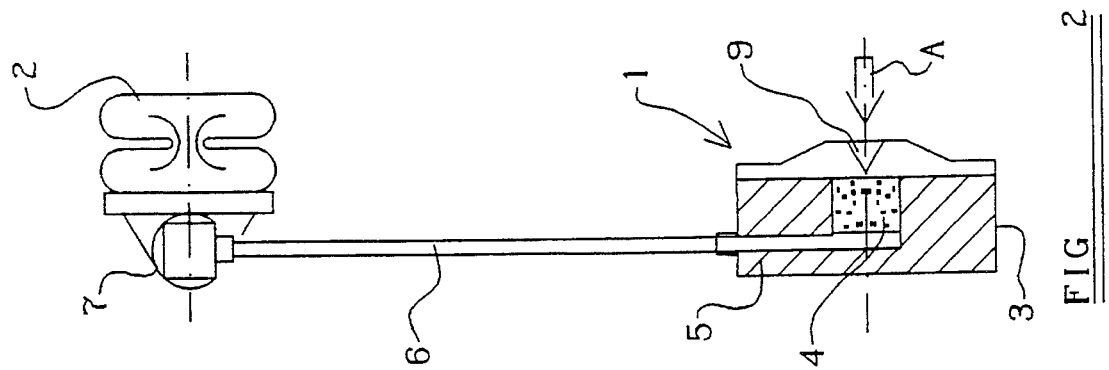
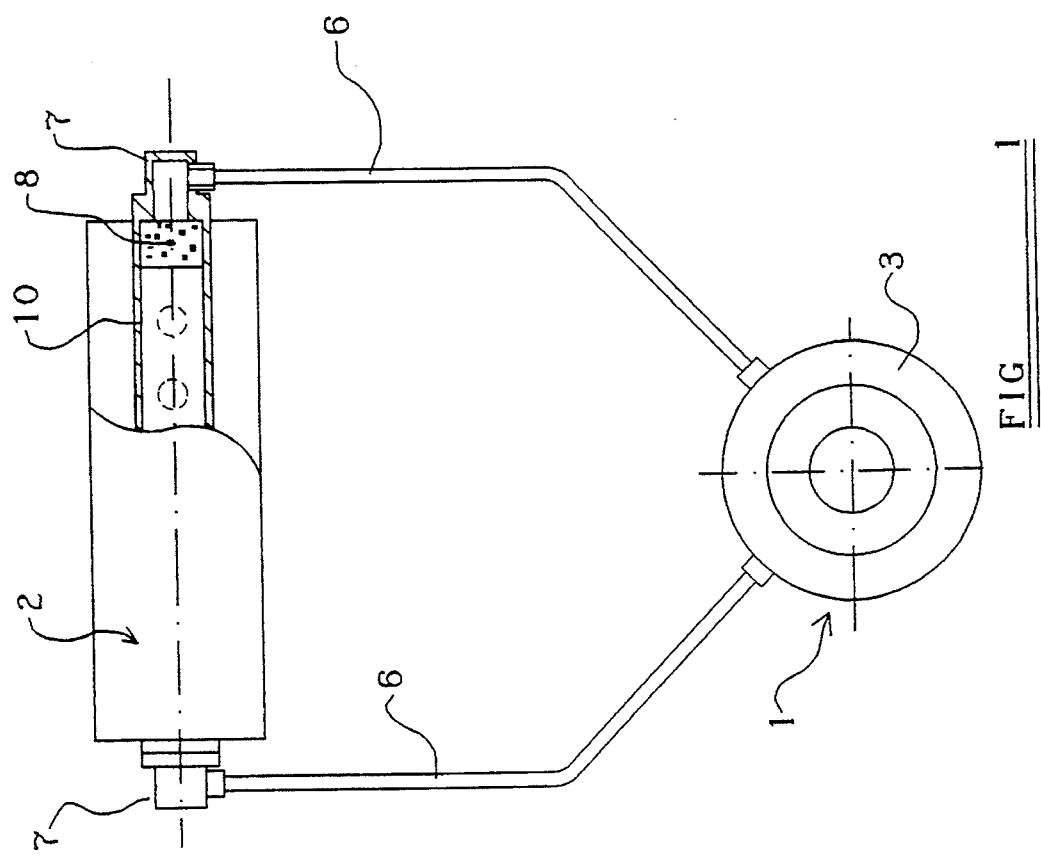

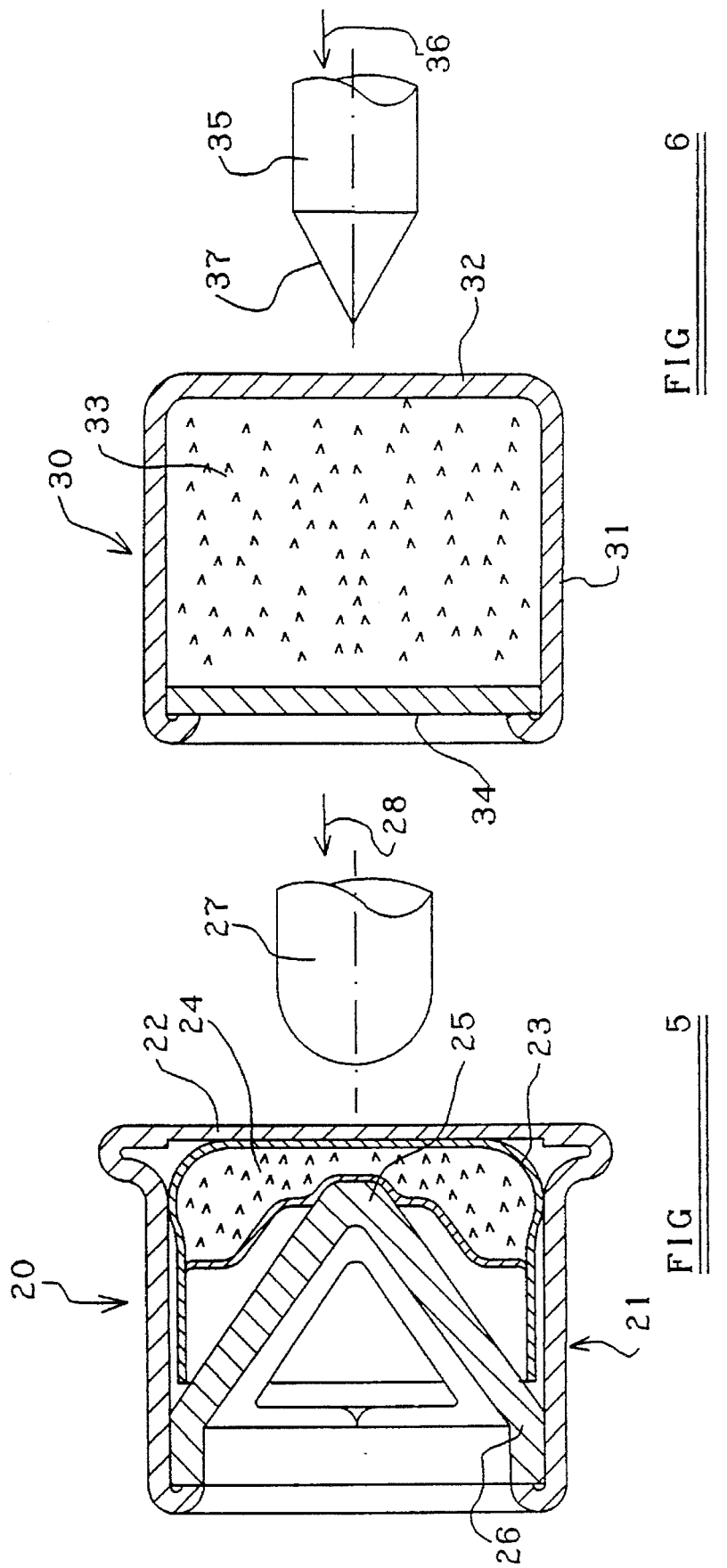

VEHICLE IMPACT SENSOR ARRANGEMENT

This application is a continuation of application Ser. No. 07/971,989, filed Feb. 19, 1993, now abandoned.

BACKGROUND OF THE INVENTION

THE PRESENT INVENTION relates to a vehicle impact sensor arrangement and more particularly relates to a vehicle impact sensor arrangement adapted to sense an impact on a vehicle and to activate a safety device within the vehicle such as an air-bag or a seat belt pre-tensioner.

When a vehicle, such as a motor car, is involved in an accident, if the vehicle is subjected to an impact or collision, the vehicle can decelerate rapidly. In such a situation a person travelling within the vehicle may continue to move at the original speed of the vehicle, due to inertia and may thus impact with part of the vehicle which has decelerated. For example, if a vehicle is subjected to a front impact, by crashing into a fixed object, the main body of the vehicle may stop relatively rapidly, whilst a person in the vehicle continues to travel forwardly, the person travelling in the vehicle thus, in effect, being thrown forwardly on to a fixed part of the vehicle, such as the steering wheel or the dash board. A similar situation exists if a vehicle is subjected to a side impact.

It has thus been proposed to provide sensors which sense an impact or collision or rapid deceleration of a vehicle, and which activate safety devices such as air-bags or seat belt pre-tensioners.

Many sensors have been proposed previously, and a significant proportion of these sensors operate to provide an electrical signal responsive of the impact. The electrical signal is utilised to trigger the air-bag or the seat belt pre-tensioner. One problem that exists where an electrical triggering system is used is that sometimes a totally "spurious" signal can be generated, due to "noise" or due to external electro-magnetic radiation, which means that the air-bag or seat belt pre-tensioner can be operated when there is no collision or impact. If the car is being driven at the time, this can seriously distract the driver, and indeed, if an air-bag is inflated, the air-bag may well impair the vision of the driver.

A further disadvantage of sensors which provide a "electric" signal is that it is often the case that during a major impact the electrical supply of the vehicle may be impaired very shortly after commencement of the impact. Thus, such sensors may fail to operate satisfactorily in a real accident situation.

During an impact, the outer skin of the vehicle moves relative to a fixed inner part of the vehicle, the chassis of the vehicle. The severity of the impact is related to the speed with which the outer skin of the vehicle moves relative to a fixed part of the vehicle. It is thus desired to be able to provide a sensor which responds to the speed of movement of the outer skin of the vehicle relative to a fixed part of the vehicle, particularly in the case of a sensor adapted and located to detect a side impact.

SUMMARY OF THE INVENTION

According to this invention there is provided a sensor arrangement for sensing an impact on a motor vehicle and for activating a safety device within the vehicle, comprising a sensor located between the outer skin of the vehicle and an inner part of the vehicle which is relatively fixed in position, the sensor being adapted to initiate activation of the safety device only when the outer skin of the vehicle moves at a speed greater than a predetermined speed relative to said fixed part of the vehicle, the arrangement comprising a sensor having a first part in the form of a housing containing pyrotechnic material and a second part in the form of a stab, one part being supported by an inner part of the vehicle which is relatively fixed in position and the other part being adapted to be moved in response to movement of the outer skin of the vehicle during an impact, the arrangement being such that in an impact situation the stab is moved into an engagement with the housing or the pyrotechnic material with a speed related to the speed of movement of the outer skin, the arrangement being such that the pyrotechnic material ignites when the speed of movement of the vehicle skin exceeds a predetermined level.

Preferably the sensor is connected to the safety device by a high-speed fuse. The sensor arrangement is preferably used in combination with a safety device activated by a pyrotechnic charge. The safety device is, for example, an air-bag. In another embodiment, the safety device is a pre-tensioner for a safety belt.

In yet another embodiment, the sensor is mounted in a door of a motor vehicle adapted to respond to a side impact and the safety device is in the form of an air-bag mounted in or adjacent the door adapted, when inflated, to be located between the door and a person sitting in the motor vehicle adjacent the door.

BRIEF DESCRIPTION OF THE DRAWINGS

In order that the invention may be more readily understood, and so that further features thereof may be appreciated, the invention will now be described, by way of example, with reference to the accompanying drawings in which:

FIG. 1 is a front view, with parts cut away, of a sensor arrangement in accordance with the invention associated with an air-bag, FIG. 2 is a side view, again with parts cut away, of the arrangement of FIG. 1, FIG. 5 is a diagrammatic view of one embodiment of percussion initiator, FIG. 6 is a schematic view of another form of percussion initiator for use with the invention.

DETAILED DESCRIPTION OF THE PREFERRED EMBODIMENTS

Figure 3:
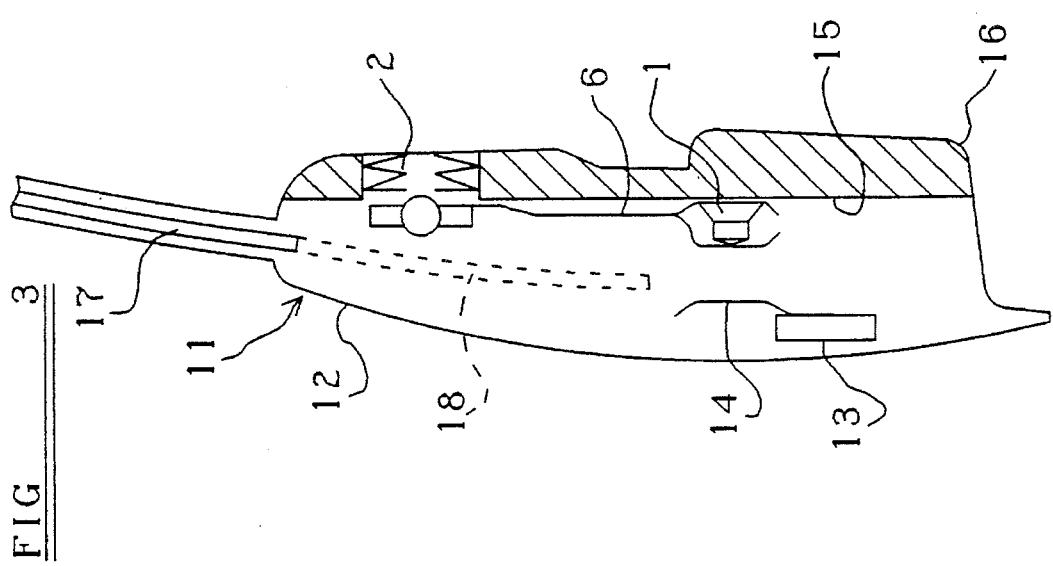
FIG. 3 is a sectional view taken through a door of a motor vehicle showing the arrangement of FIGS. 1 and 2 in use.

Referring now to the drawings, FIGS. 1 and 2 illustrate a sensor arrangement 1 associated with an air-bag 2. The sensor arrangement 1 consists of a substantially solid housing 3 which defines an inner chamber 4 substantially open to one side of the housing, which contains an appropriate pyrotechnic material. The open end of the chamber may be closed by a thin membrane. Passages 5 leads from the chamber 4, these passages each containing one end of a high speed fuse cord, or so-called "shock-tube", such as the fuse cord sold under the designation "NONEL". In the embodiment illustrated two passages 5 are provided in the housing, a respective fuse cord 6 passing through each passage. Each fuse cord 6 passes to a gas generator housing 7 which contains a further pyrotechnic charge 8. The gas generator housings 7 are located at opposite ends of a perforated tube which passes through part of the air-bag 2. The air-bag 2 is initially in a collapsed or un-inflated condition.

A stab 9 is provided located adjacent the recess 4 which contains a pyrotechnic material. The stab 9 consists of a painted element made of metal. As will be described hereinafter the sensor 1 is located so that in an impact situation the stab 9 is driven into the recess 4, as generally indicated by the arrow A. Due to the friction effect between the stab 9 and the pyrotechnic material within the cavity 4, the temperature of the pyrotechnic material near the stab is elevated and the pyrotechnic material is ignited. The friction effect will only generate sufficient heat to ignite the pyrotechnic material if the speed of the stab is greater than a predetermined minimum speed.

If the speed of the stab is greater than the minimum speed the pyrotechnic material is ignited and the fuses 6 are also ignited. The fuses form a high speed path for the ignition, and the ignition can travel along this path at speeds between 2,000 and 8,000 meters per second. The fuses in turn ignite the pyrotechnic charges 8 in the gas generator housings 7. Consequently, the pyrotechnic charge 8 within each gas generator housing 7 is very rapidly ignited almost immediately after the stab 9 exerts the friction effect on the pyrotechnic material in the recess 4. These pyrotechnic charges generate gas which pass through the apertures formed in the aperture tube 10 to inflate the air-bag 2.

From the description given above it will be appreciated that the described arrangement is totally non-electric, in that no electric signals are utilised whatsoever, and the system is not dependent upon the functioning of the main electric supply system of the vehicle.

Figure 4:
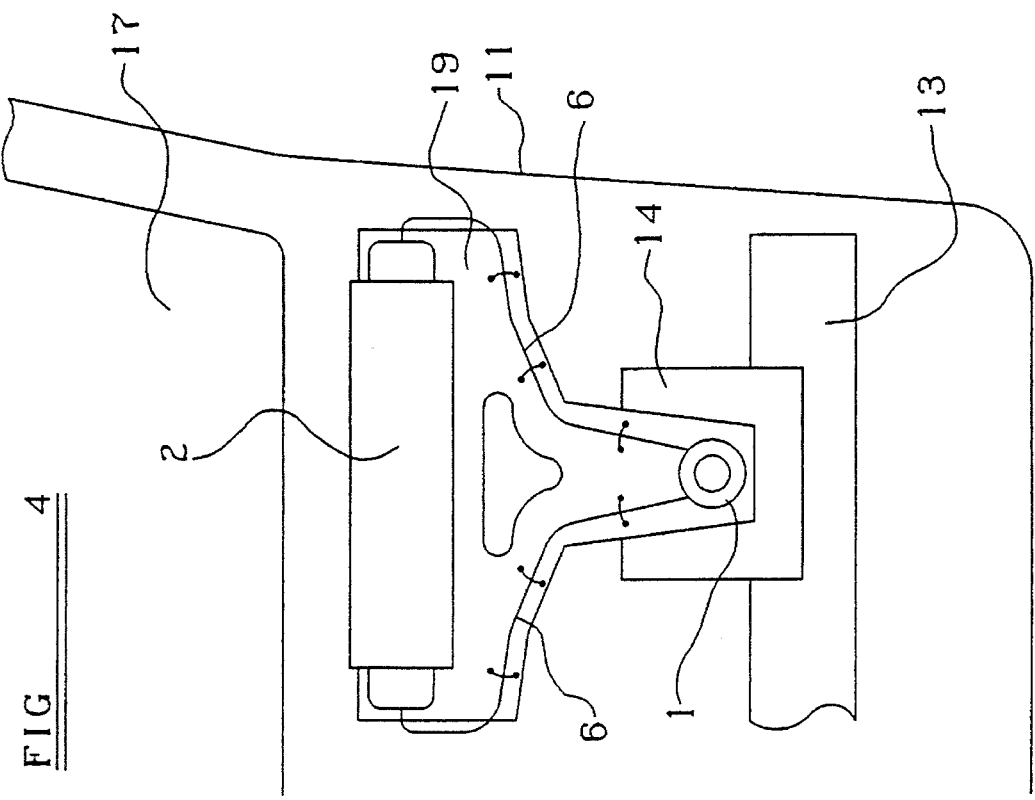
FIG. 4 is a view from the inside of the door, with the inner cladding of the door removed.

Turning now to FIGS. 3 and 4, the system described above with reference to FIGS. 1 and 2 is now illustrated in position within a door of a motor vehicle. Thus, the sensor is located in position adapted to sense a side impact. The air-bag is mounted in the door and is adapted to form a cushion between the door and the person sitting adjacent the door in the event that a side impact arises.

Thus FIGS. 3 and 4 illustrate schematically a door 11 of a motor vehicle. The door presents an outer skin 12, this outer skin being relatively thin and thus being deformed in a side impact. Located adjacent the outer skin 12 is a reinforcing bar 13, and the reinforcing bar 13 carries an extension plate 14. The extension plate 14 is located adjacent the sensor assembly 1 which is fixed in position on the inner skin 15 of the door. The inner skin 15 carries padding and interior lining 16. The high speed fuse 6 is mounted within the interior cavity of the door, and the air-bag 2 is mounted in position on the inside of the door adjacent the lower part of the window 17 provided in the door. The window 17 may be lowered, when it occupies a position 18 as shown in phantom.

Referring now to FIG. 4, it can be seen that the sensor 1, the fuses 6 and the air-bag assembly 2 are mounted in position on a support plate 19 which is located in the interior cavity of the door.

It is to be appreciated that in the event that a side impact occurs, the reinforcing bar 13 will be deflected, thus bringing the force transmitting plate 14 into contact with the sensor assembly 1. The sensor assembly will thus be triggered, with the stab engaging the pyrotechnic material, and the air-bag 2 will then be inflated.

FIGS. 5 and 6 illustrate two alternate embodiments of the sensor which could be used in place of the sensor assembly 1 described above.

Referring initially to FIG. 5, a sensor assembly 20 comprises an outer housing 21 of generally cylindrical form having a flexible closed end 22. Contained within the housing is a sack 23 which contains pyrotechnic material 24. The sack rests over the apex 25 of the conical rigid member 26 which is located within the housing 21. The rigid conical member 26 is firmly mounted in position. A stab 27 is provided for use with the arrangement illustrated, the stab being adapted to move towards the flexible end 22 of the cylindrical housing 21 in the direction indicated by the arrow 28 in the event that in impact occurs. The stab 27 may be formed of metal or plastic and is in the form of an elongate rod with a rounded or dome-like end. The stab 27 will contact the flexible end 22 of the housing and will thus compress a pyrotechnic material 25 against the end 25 of the conical member 26. If the stab is moving with sufficient speed, heat will be generated within the pyrotechnic material as part of the pyrotechnic material is compressed between, effectively, the end of the stab and the apex 25 of the conical member 26. The degree of heat depends upon the speed of compression of the pyrotechnic material and once the appropriate temperature is reached within the pyrotechnic material, the pyrotechnic material 24 will be ignited.

FIG. 6 illustrates a modified arrangement 30 in which a cylindrical housing 31 is provided having a closed end 32. The housing contains pyrotechnic material 33 which is retained within the housing by a means of a closure disc 34. A sharp pointed stab 35 is provided for use with this sensor arrangement, the stab moving towards the sensor arrangement in the direction indicated by the arrow 36 in the event of an impact. The pointed end 37 of the stab 35 will penetrate the closure 32 of the cylindrical housing 31, and the pointed end 37 of the stab will then engage the pyrotechnic material 33. A frictional effect will exist between the pointed end 37 of the stab and the pyrotechnic material, this frictional effect generating heat dependent upon the speed of the stab 35 relative to the pyrotechnic material 33. If the speed of the stab is sufficient, the frictional effect will generate sufficient heat to initiate the pyrotechnic material 33.

It is thus to be understood that in the described embodiments of the present invention, the pyrotechnic material within the sensor 1, 20 or 30 is effectively ignited when the speed of the stab 9, 27 or 35 exceeds a predetermined limit. The speed of a stab does exceed this limit the frictional effect between the stab and the pyrotechnic material, or the deformation effect of the pyrotechnic material in the case of the embodiment of FIG. 5, is such that the degree of heat generated is adequate to ignite the pyrotechnic material. Of course, a true percussion pyrotechnic material could be used, ignited by the shock wave when the stab engages the pyrotechnic material. Once the pyrotechnic material within the sensor 1, 20 or 30 has been ignited, the high speed fuse 6 will be ignited and will almost instantaneously ignite the pyrotechnic charge 8 within the gas generator 7 of the air-bag 2.

Figure 7:
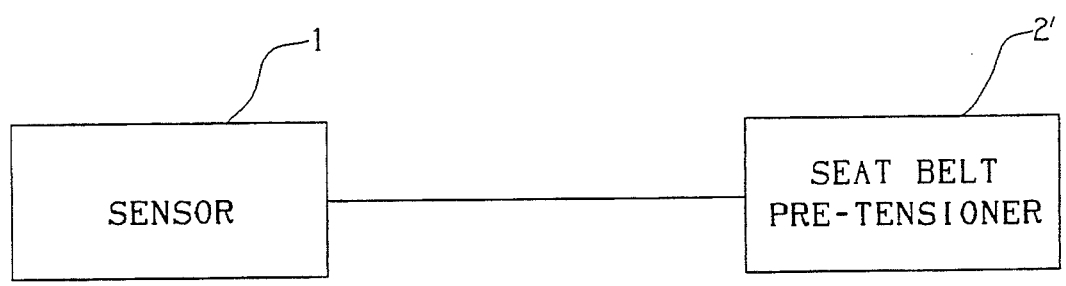
FIG. 7 is a block diagram of an alternative embodiment of the invention where the sensor arrangement is coupled to a seat-belt pre-tensioner.

Whilst the invention has been described with specific reference to arrangements to detect a side impact, the invention is not restricted to such an arrangement, since the invention could be utilised to detect a front impact or a rear impact. Also, while the invention has been described with reference to the inflation of an air-bag in response to a sensed impact, it is to be appreciated that as illustrated in block diagram form in FIG. 7, the sensor 1 of the invention may be utilised in conjunction with a seat belt pre-tensioner 21.

It is to be appreciated that the sensor of the invention is adapted to be mounted in position between a fixed part of the vehicle and the outer skin of the vehicle, and is responsive to the speed of deformation of the outer skin of the vehicle relative to the fixed part of the vehicle. If the speed of deformation is not large, in certain embodiments the stab will not generate sufficient heat to activate the pyrotechnic material and thus the sensor will not activate the safety device. It is only when the speed of deformation of the skin of the vehicle is sufficiently great to generate the necessary heat within the pyrotechnic material to ignite the pyrotechnic material that the sensor activates the safety system. In other embodiments if the speed of deformation of the outer skin is not sufficient, the hydraulic system will not generate sufficient pressure to activate the pyrotechnic device.

I claim:

1. A sensor arrangement for sensing a side impact on a motor vehicle which has a side having an outer skin and for activating a safety device within the vehicle, comprising:
   a sensor located between the outer skin of the side of the vehicle and an inner part of the vehicle which is relatively fixed in position, said sensor being adapted to initiate activation of the safety device only when the outer skin of the side of the vehicle moves at a speed greater than a predetermined speed relative to said fixed part of the vehicle, said sensor having:
      a first part in the form of a housing containing a pyrotechnic material, and
      a second part in the form of a stab,
   wherein one of said first and second parts is supported by an inner part of the vehicle which is relatively fixed in position and wherein the other of said first and second parts is adapted to be moved in response to movement of the outer skin of the side of the vehicle during an impact,
   wherein in an impact situation the second part in the form of a stab is moved into an engagement with the first part in the form of a housing containing a pyrotechnic material with a speed related to the speed of movement of the outer skin of the side of the vehicle, and
   wherein the pyrotechnic material ignites when the speed of movement of the outer skin of the side of the vehicle exceeds a predetermined level.

2. A sensor arrangement according to claim 1, wherein said sensor is connected to the safety device by a high-speed fuse.

3. A sensor arrangement according to claim 2, in combination with a safety device, further comprising a pyrotechnic charge, wherein the safety device activated by said pyrotechnic charge.

4. A sensor arrangement according to claim 3, wherein the safety device is an air-bag.

5. A sensor arrangement according to claim 3, wherein the safety device is a pre-tensioner for a safety belt.

6. A sensor arrangement according to claim 3, wherein the sensor is mounted in a door of a motor vehicle adapted to respond to a side impact, and
   wherein the safety device is in the form of an air-bag mounted in the door adapted, when inflated, to be located between the door and a person sitting in the motor vehicle adjacent the door.

7. A sensor arrangement according to claim 1, in combination with a safety device, further comprising a pyrotechnic charge, wherein the safety device is activated by said pyrotechnic charge.

8. A sensor arrangement according to claim 7, wherein the safety device is a pre-tensioner for a safety belt.

9. A sensor arrangement according to claim 7, wherein the vehicle has a side door, the outer skin of the side of the vehicle being an outer skin of the side door of the vehicle, wherein the sensor is mounted in the side door of the vehicle for responding to a side impact, and
   wherein the safety device is in the form of an air-bag mounted in the door adapted, when inflated, to be located between the door and a person sitting in the motor vehicle adjacent the door.

10. A sensor arrangement according to claim 7, wherein the safety device is an air-bag.

11. A sensor arrangement for sensing an impact on a motor vehicle, the motor vehicle having an outer skin and an inner part relatively fixed in position, and for activating a safety device within the motor vehicle, comprising:
    a high speed fuse; and
    sensor means connected to the safety device by said high speed fuse and located between the outer skin and the inner part of the vehicle, for initiating activation of the safety device only when the outer skin of the motor vehicle moves at a speed greater than a predetermined speed relative to the fixed part of the motor vehicle, said sensor means having:
       a housing;
       a pyrotechnic material disposed within the housing for igniting said high speed fuse only when the speed of movement of the outer skin exceeds the predetermined speed; and
       a stab for engaging the housing and activating said pyrotechnic material;
    wherein one of said housing and said stab is supported by the inner part of the motor vehicle, and the other of said housing and said stab is movable in response to movement of the outer skin of the motor vehicle during an impact so that said stab moves into an engagement with said housing with a speed related to the speed of movement of the outer skin and activates said pyrotechnic material.

* * * * *